(12) United States Patent  
Tse et al.

(10) Patent No.: US 6,253,339 B1  
(45) Date of Patent: Jun. 26, 2001

(54) ALARM CORRELATION IN A LARGE COMMUNICATIONS NETWORK

(75) Inventors: Edwin Tse, Montreal; Nicolas Gosselin, Blainville, both of (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/181,583

(22) Filed: Oct. 28, 1998

(51) Int. Cl.$^7$ .................................................. G06F 11/30
(52) U.S. Cl. ............................................... 714/47; 370/216
(58) Field of Search .................................. 714/47, 48, 4, 714/8, 20, 25, 26, 39, 51, 15; 370/216, 241, 242; 340/825.16, 825.07, 508, 501

(56) References Cited

U.S. PATENT DOCUMENTS

| | | | |
|---|---|---|---|
| 5,309,448 | * 5/1994 | Bouloutas et al. | 371/29.1 |
| 5,473,596 | 12/1995 | Garafola et al. | 370/13 |
| 5,495,470 | * 2/1996 | Tyburski et al. | 370/14 |
| 5,500,853 | * 3/1996 | Engdahl et al. | 370/17 |
| 5,646,864 | * 7/1997 | Whitney | 364/514 B |
| 5,737,319 | * 4/1998 | Croslin et al. | 370/255 |
| 5,748,098 | * 5/1998 | Grace | 340/825.16 |
| 5,768,501 | * 6/1998 | Lewis | 395/185.01 |
| 5,946,373 | 8/1999 | Harris | 379/26 |
| 5,949,759 | 9/1999 | Cretegny et al. | 370/250 |
| 6,000,045 | * 12/1999 | Lewis | 714/47 |
| 6,012,152 | * 1/2000 | Douik et al. | 714/26 |
| 6,124,790 | * 9/2000 | Golov et al. | 340/508 |

FOREIGN PATENT DOCUMENTS

0549937A1 7/1993 (EP) .  
2318479 4/1998 (GB) .

OTHER PUBLICATIONS

S. Kätker and M. Paterok; "Fault Isolation and Event Correlation for Integrated Fault Management"; *Proc 5th IFIP/IEEE International Symposium on Integrated Network Management*; 1997; pp. 583–595.

* cited by examiner

*Primary Examiner*—Nadeem Iqbal  
(74) *Attorney, Agent, or Firm*—Smith, Danamraj & Youst, P.C.

(57) ABSTRACT

A system and method of correlating alarms from a plurality of network elements (NEs) in a large communications network. A plurality of uncorrelated alarms are collected by an alarm collector from alarm reporters. An alarm correlator then partitions the alarms into correlated alarm clusters such that alarms of one cluster have a high probability that they are caused by one network fault. The partitioning of the alarms is performed by creating alarm sets, expanding the alarm sets into alarm domains, and merging the alarm domains into alarm clusters if predefined conditions are met. The sets are formed by selecting an alarmed NE at the highest network hierarchy level which is not tagged, finding all of its contained NEs, and finding NEs that are peer-related to those contained NEs that are in an alarmed state. The sets are expanded into domains by finding NEs that are not in an alarmed state which contain the highest level alarmed NE in each alarm set. The domains are merged into one alarm cluster if the two domains have at least one common NE, at least one of the common NEs is not tagged, and the majority of the NEs contained by the non-tagged common NE are in an alarmed state.

9 Claims, 6 Drawing Sheets

ALARM CORRELATION IN A LARGE COMMUNICATIONS NETWORK

BACKGROUND OF THE INVENTION

1. Technical Field of the Invention

This invention relates to software fault management systems and, more particularly, to a method of correlating multiple network alarms in a large communications network.

2. Description of Related Art

In communications networks, a single network fault may generate a large number of alarms over space and time. In large, complex networks, simultaneous network faults may occur, causing the network operator to be flooded with a high volume of alarms. The high volume of alarms greatly inhibits the ability to identify and locate the responsible network faults.

In the 1997 IEEE paper, *Fault Isolation and Event Correlation for Integrated Fault Management*, the authors, S. Katker and M. Paterok, describe a state-of-the-art algorithm for alarm correlation. The Katker and Paterok algorithm, however, has several disadvantages. First, the algorithm processes alarms very inefficiently. As noted above, a single fault may trigger a large number of network alarms. For example, one fibre cut can result in hundreds of thousands of alarms being reported from circuits supported by the fibre. The Katker and Paterok algorithm initiates a large number of computing threads, each of which ultimately results in the same conclusion. Thus, an excessive amount of time and computational resources are utilized. Additionally, the Katker and Paterok algorithm fails to correlate network element (NE) alarms that are caused by a faulty NE that does not itself generate an alarm.

In order to overcome the disadvantages of existing solutions, it would be advantageous to have a system and method of correlating large numbers of network alarms which greatly reduces the time and computational resources utilized, and supports near real-time alarm correlation. The present invention provides such a system and method.

SUMMARY OF THE INVENTION

In one aspect, the present invention is a system for correlating alarms from a plurality of network elements (NEs) in a large communications network. The system comprises a plurality of alarm reporters that report alarms from the NEs when faults are detected, and an alarm correlator that partitions the alarms into correlated alarm clusters such that alarms of one cluster have a high probability that they are caused by one network fault.

In another aspect, the present invention is a method of correlating alarms from the NEs in a large communications network. The method includes the steps of collecting a plurality of uncorrelated alarms from the NEs, and partitioning the alarms into correlated alarm clusters such that alarms of one cluster have a high probability that they are caused by one network fault. The step of partitioning the alarms into correlated alarm clusters may include the steps of creating alarm sets, expanding the alarm sets into alarm domains, and merging the alarm domains into alarm clusters if predefined conditions are met. The domains are merged into one alarm cluster if, and only if, the two domains have at least one common NE, at least one of the common NEs is not tagged, and the majority (as defined by the network operator) of the NEs contained by the non-tagged common NE are not in an alarmed state.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a method of partitioning alarms into sets in such a way that each set of alarms is probably caused by the same fault. The method utilizes network alarm propagation characteristics, alarm cause codes, network hierarchy (digital/analog hierarchy and equipment containment hierarchy), and network topology information to partition the alarms into sets. Presentation of alarms in partitioned sets reduces the time required to locate network faults so that more time can be spent fixing them. By assigning network operators to locate network faults based on alarm sets rather than alarm severity, alarm type, or reporting location, duplication of effort is reduced. The present invention greatly reduces computational time and resources required to provide rapid, consistent, and repeatable alarms correlation. Thereafter, the network operator may perform known fault location and identification techniques in a more accurate and efficient manner. The method of the present invention is simple, does not depend on experienced network operator knowledge to be captured and tailored to each network, and can be executed in parallel to increase speed.

Figure 1:
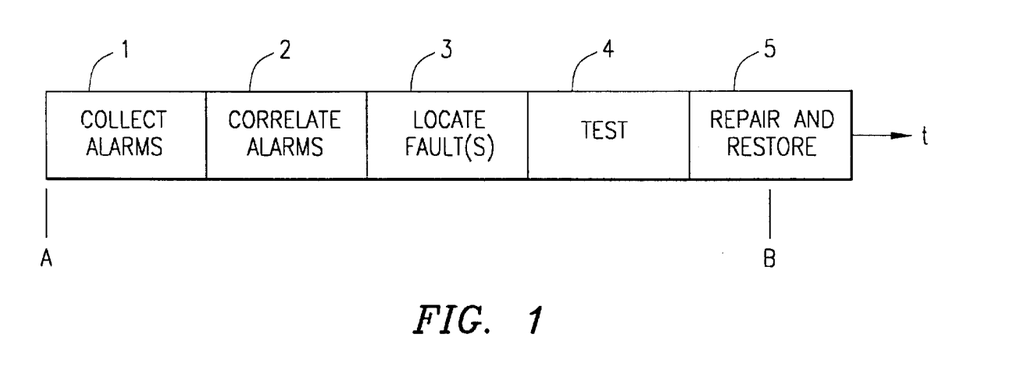
FIG. 1 is a time line illustrating the sequence of tasks for network fault management.

FIG. 1 is a time line illustrating the sequence of tasks for network fault management. At time point A, a network fault occurs. The fault management process must then perform five tasks 1–5 in order to restore the network to full operational capability. The tasks are to (1) collect alarms and alert the operator of the alarms caused by the network fault, (2) correlate alarms, (3) locate the fault(s) causing the alarms, (4) test to confirm fault location, and (5) repair the faults and restore the network. At time point B, the paying customer perceives that lower quality of service is being provided. The objective of the fault management process, then, is to restore the network before the customer perceives any drop in quality of service. Thus, the more rapidly tasks 1–5 can be performed, the greater the likelihood that the network can be restored in time.

The present invention performs three major tasks to achieve its overall objectives. First, the method partitions reported network alarms into related sets (called correlated alarm sets) such that alarms of one set have a high probability that they are caused by one network fault. Second, the method displays the correlated alarms in a list in an Alarm Viewer (AV). Correlated alarms of one set are sorted based on severity, time, etc. and then sequentially listed in the AV. Third, the method displays the alarms in the AV in graphical form. Alarmed managed objects whose alarms are in one correlated alarm set are displayed as nodes of a graph. Non-alarmed managed objects that propagate alarms within the set are displayed as different nodes of the same graph. If there are multiple network faults, then multiple graphs are displayed.

Figure 2:
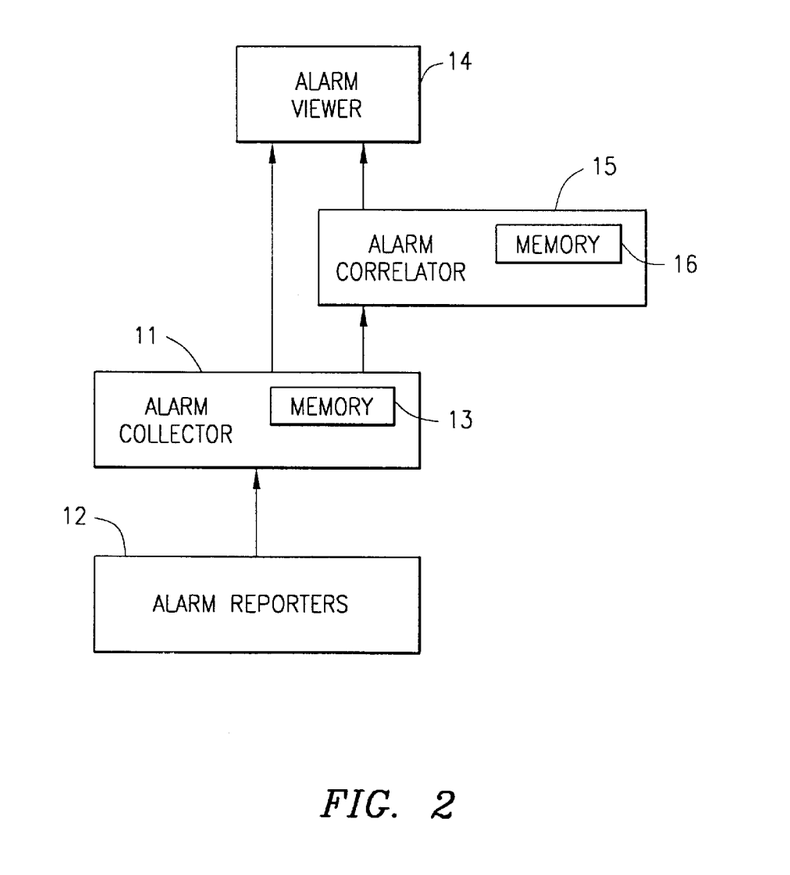
FIG. 2 is a functional block diagram illustrating the data flow between functional blocks of the present invention.

FIG. 2 is a functional block diagram illustrating the data flow between functional blocks of the present invention. An Alarm Collector (AC) 11 collects uncorrelated alarms from various Alarm Reporters (AR) 12 and stores them in its persistent memory 13. The alarm reporters may be part of a NE or external to a NE. Alarm reporters report alarms to the alarm collector using a normalized format. Operators can view these uncorrelated alarms using the Alarm Viewer (AV) 14. The Alarm Correlator (ACOR) 15 reads uncorrelated alarms from the AC, separates the alarms into correlated alarm sets, and stores them in its cache memory 16. The alarm viewer, on demand by the operator, fetches correlated alarm sets for display.

The alarm correlator 15 is not event driven in the sense that the alarm correlator will not start a thread (of execution) based on each incoming alarm. In a large network, an alarm rate of 1 alarm per second is not uncommon. In case of an alarm storm caused by a high capacity facility failure (a situation when the alarm correlation method is most useful), the alarm rate can be much higher. Execution threads, spawned at such a rate, may not be able to do meaningful work since they all are competing for limited system resources. Instead, the alarm correlator takes a "snap shot" of all alarms in the network at any moment, correlates the alarms in multiple passes into alarm clusters, and processes each correlated alarm cluster in one thread.

Before execution of the thread, the alarm correlator 15 has NE information in its cache memory 16. Therefore, the correlation method can proceed at memory speed. There is no requirement for the alarm correlator, while executing the thread, to query other systems or the network to retrieve required information, such as NE relations.

The correlation method of the present invention utilizes several types of input information. The types of relationships among NEs (managed objects) are important inputs to the methodology. Three keys types of NE relationships are the span relation, the contain relation, and the peer relation. Examples of span relations are "Circuit-XYZ spans 6 routing nodes" or "Circuit-ABC spans 8 facilities".

Figure 3:
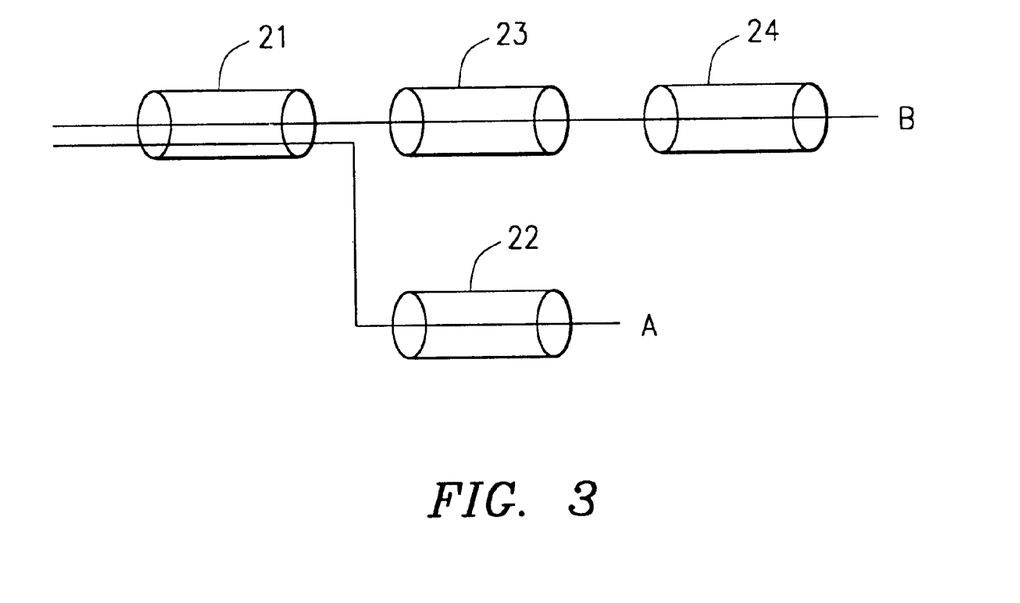
FIG. 3 is an illustrative drawing of two simple span relations.

FIG. 3 is an illustrative drawing of two simple span relations. The span relation is unidirectional and one-to-many. An example of a span relation is "Circuit-XYZ spans 6 routing nodes". In FIG. 3, line A which is drawn through facilities 21 and 22 represents the span relation "Circuit-A spans two facilities". Line B which is drawn through facilities 21, 23, and 24 represents the span relation "Circuit-B spans three facilities".

Figure 4:
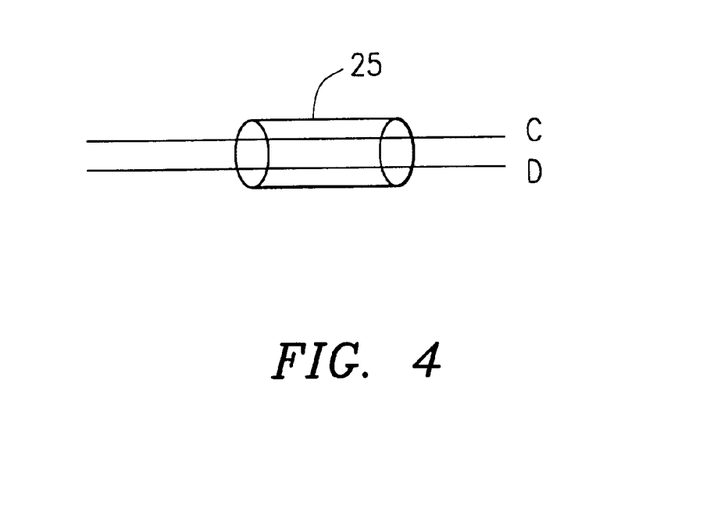
FIG. 4 is an illustrative drawing of a simple contain relation.

FIG. 4 is an illustrative drawing of a simple contain relation. The contain relation is unidirectional and is one-to-many. Examples of contain relations are "a card contains 10 ports", "a log contains 200,000 records", and "a DS1 contains 24 DS0 circuits". In FIG. 4, lines C and D are drawn passing through facility 25 and illustrate the contain relation "facility-F contains two circuits".

The peer relation is bidirectional and is one-to-one. Examples of peer relations are "port-5 connects to one end of circuit-xyz" and "Circuit-xyz is used by customer-y".

To assist in partitioning the alarms into correlated alarm sets, the alarm correlator 15 constructs and maintains a database of NEs. This database carries minimal NE information such as name, relations, and alarm states of the NEs. The information in this database may be cached for fast performance. The information is updated whenever the configuration of the real network changes.

Figure 5A:
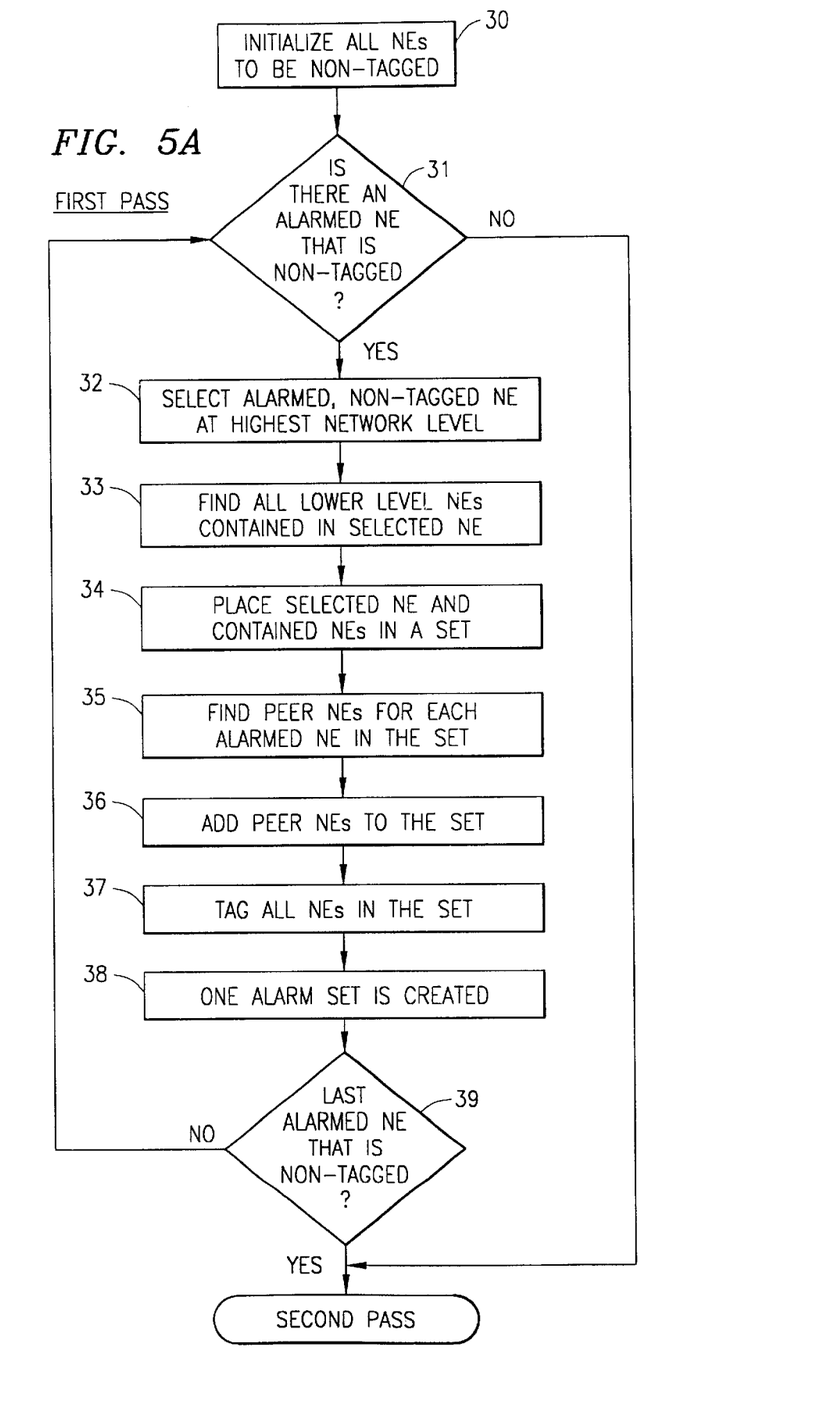
FIGS. 5A–5C are a flow chart illustrating the steps of the preferred embodiment of the method of the present invention.
Figure 5B:
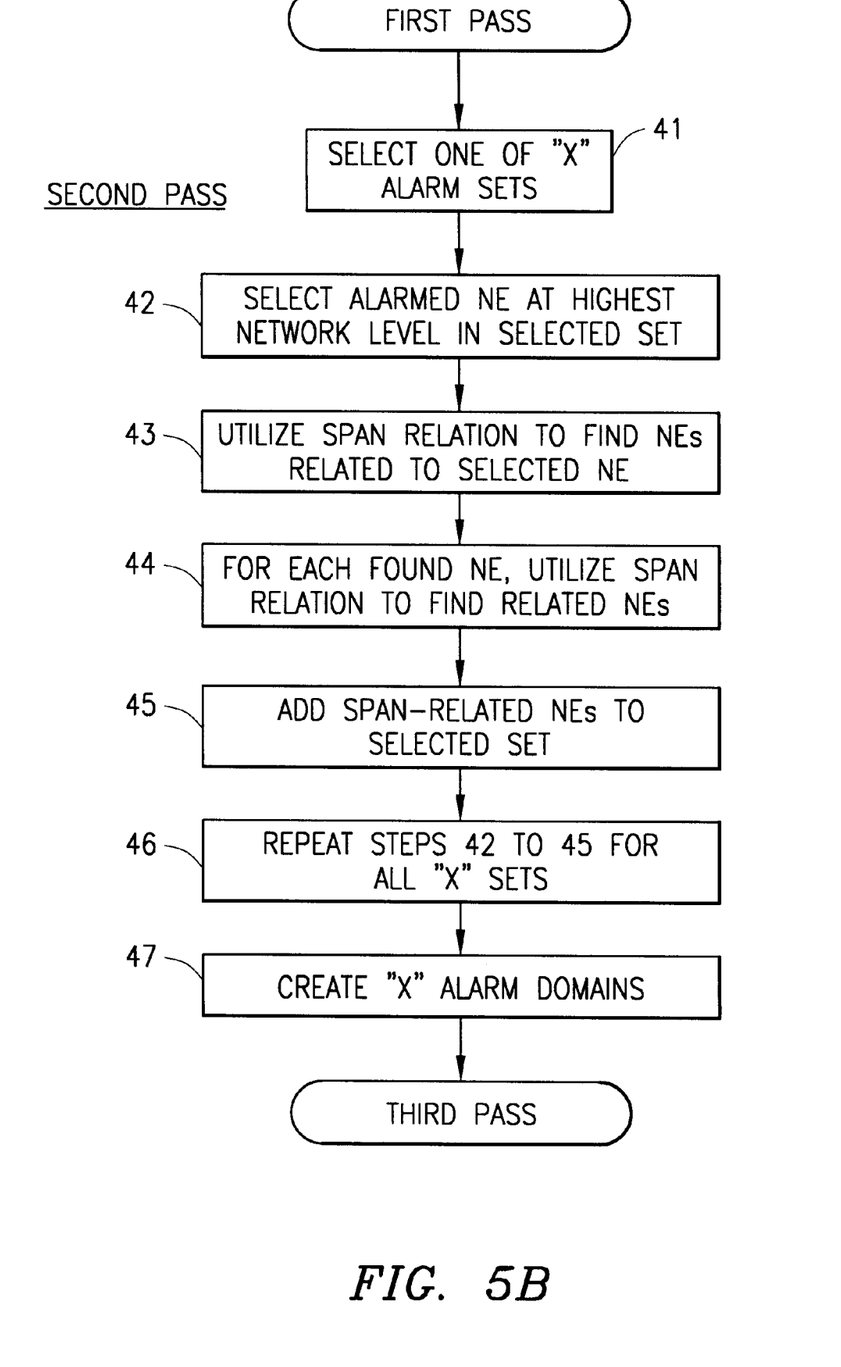
Figure 5C:
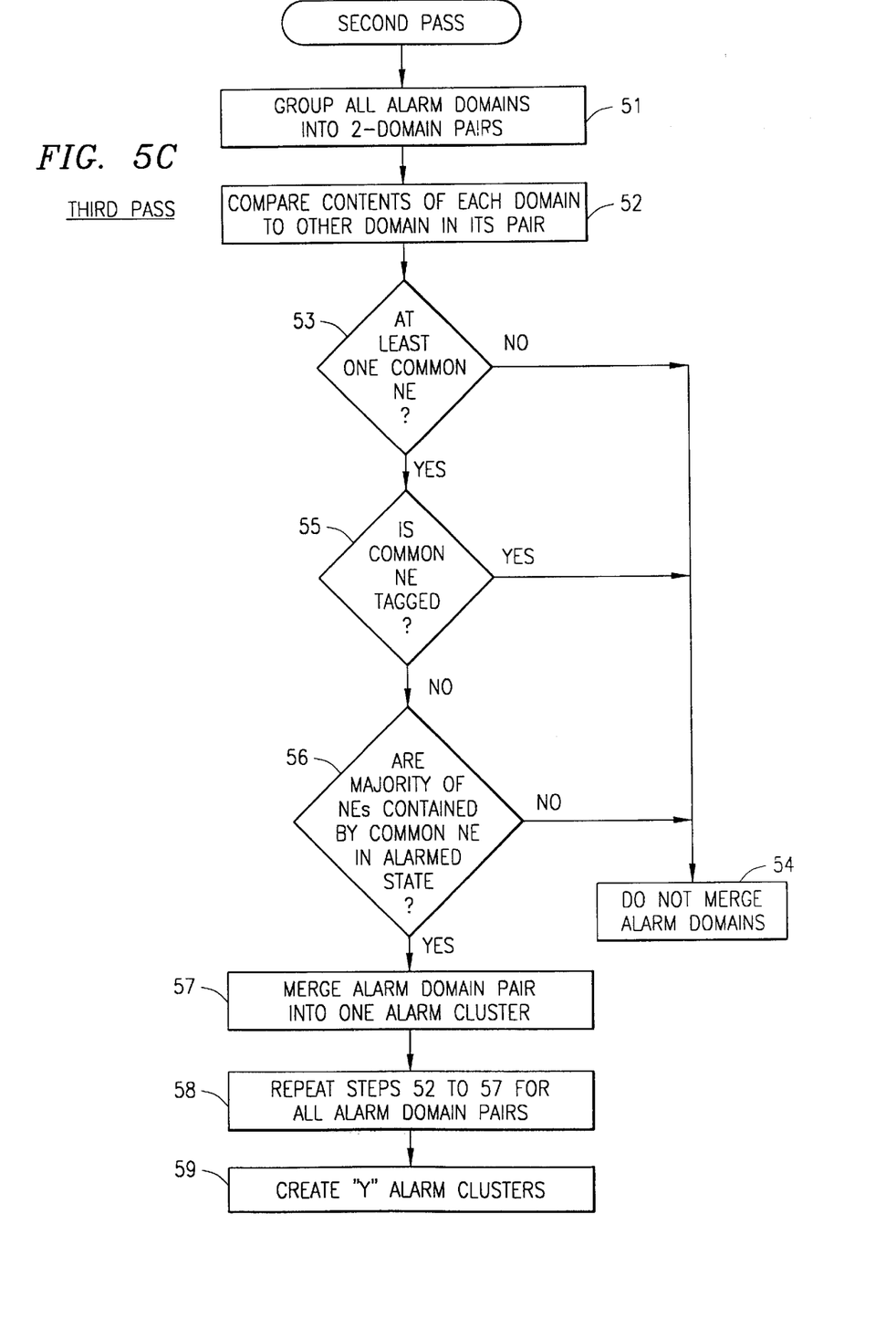

FIGS. 5A–5C are a flow chart illustrating the steps of the preferred embodiment of the method of the present invention. The present invention utilizes a three-pass methodology to provide rapid, consistent, and repeatable alarms correlation (task 2 of FIG. 1). The method correlates alarms and partitions the alarms into correlated alarm clusters containing related alarms. The three passes are described below.

First Pass:

Referring to FIG. 5A, the first pass partitions alarms into sets and reduces the search space for the second and third passes. In an initialization step 30, all NEs are set to be "non-tagged" (i.e., not yet processed). At step 31, the method first determines whether or not there exists an alarmed network element (NE) that is non-tagged. If no such NEs exist, the method skips to the second pass. If one or more such NEs exist, the method selects the one which is at the highest network hierarchy level at step 32. Starting with the selected NE, the method finds all lower level NEs at step 33 that are directly or indirectly contained in the selected NE. At step 34, all of the found NEs and the high level selected NE are all placed in a set. For each alarmed NE in the set, the peer relation is used at 35 to find peer-related NEs. All of the found peer-related NEs are added to the set at 36. All NEs in the set are tagged at step 37. This creates one alarm set at 38. At step 39 it is determined whether or not the alarmed, non-tagged NE was the last alarmed NE that is non-tagged. If not, the method then returns to step 31, and repeats the process for each alarmed NE in the network that is not tagged. If the alarmed, non-tagged NE was the last alarmed NE that is non-tagged, the method proceeds to the second pass. If there are "X" such NEs, then the first pass ends by creating X sets of NEs, and proceeds to the second pass in FIG. 5B.

Second Pass:

Referring to FIG. 5B, the second pass searches for higher level NEs that are not in an alarmed state or tagged, but that contain the highest level alarmed NE in each set. To do so, the second pass begins at step 41 by selecting one of the X sets identified in the first pass. At 42, the method selects the alarmed NE that is at the highest network hierarchy level in the set. The span relation is utilized at 43 to find all span-related NEs. For each found NE, the span relation is utilized again at step 44 to find its span-related NEs. All of the found span-related NEs are added to the set at 45. The procedure in steps 42 to 45 is then repeated at step 46 for all X sets of alarms. The second pass ends at 47 with X sets of alarms called Alarm Domains being created. The method then proceeds to the third pass in FIG. 5C.

Third Pass:

Referring to FIG. 5C, the third pass analyzes the Alarm Domains and merges two domains into one Alarm Cluster, based on the characteristics of one or more common NEs. The two domains are merged even if the common NE is not in an alarmed state. At step 51, the Alarm Domains are grouped into 2-domain pairs. At step 52, the method then compares the contents of each domain with the contents of the other domain with which it has been paired. The domains are merged into one alarm cluster if, and only if, the two domains have at least one common NE, at least one of the common NEs is not tagged, and the majority (as defined by the network operator) of the NEs contained by the non-tagged common NE are not in an alarmed state.

Thus, at step 53, it is determined whether or not the two domains share at least one common NE. If not, the method moves to step 54, and the domains are not merged. If there is at least one common NE, the method moves to step 55 where it is determined whether or not the common NE is tagged. If the common NE is tagged, the method moves to step 54, and the domains are not merged. If the common NE is not tagged, the method moves to step 56 where it is determined whether or not the majority of the NEs contained by the non-tagged common NE are in an alarmed state. If the majority of the NEs are not in an alarmed state, the method moves to step 54, and the domains are not merged. If the majority of the NEs are in an alarmed state, the method moves to step 57 where the two domains are merged into one Alarm Cluster. The procedure in steps 52 to 57 is then repeated at step 58 to merge all possible domains and create "Y" Alarm Clusters at 59.

Figure 6:
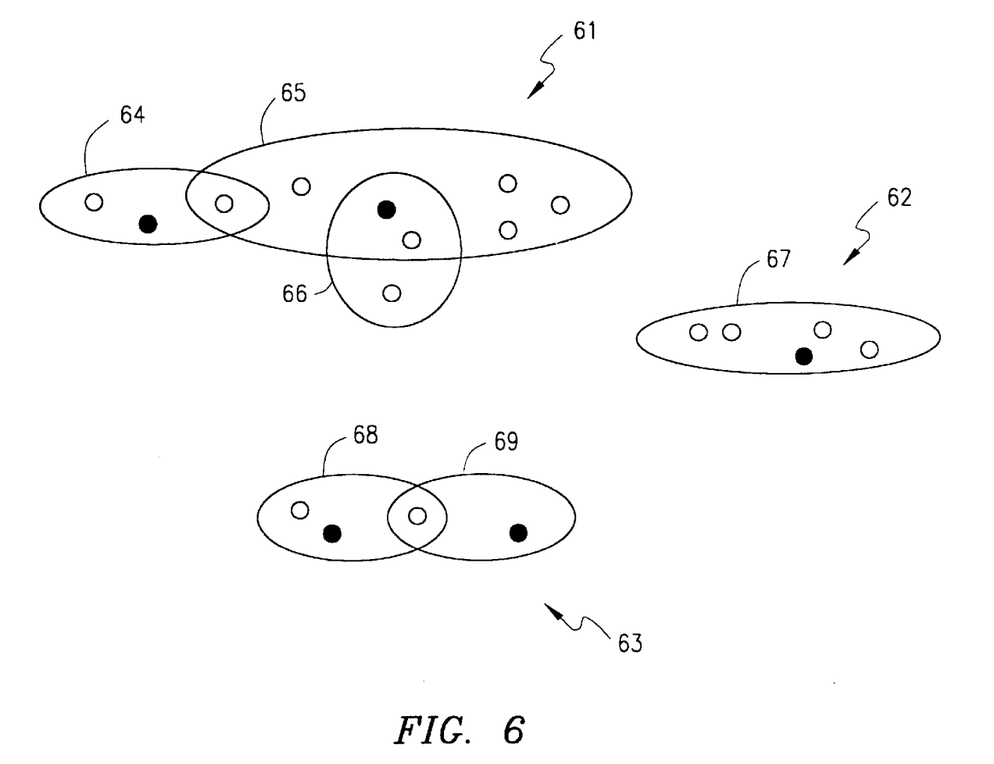
FIG. 6 is an illustrative drawing of the relationship between alarm domains and alarm clusters.

FIG. 6 is an illustrative drawing of the relationship between alarm domains and alarm clusters. The figure includes three (3) alarm clusters 61–63. There are a total of six (6) alarm domains. Alarm cluster 61 includes three (3) alarm domains 64–66. Alarm cluster 62 includes one (1) alarm domain 67. Alarm cluster 63 includes two (2) alarm domains 68–69. NEs (represented by small circles) exist in the alarm domains, and at least one NE is in the alarmed state (dark circle) within each alarm domain. The relations between NEs are not shown in the figure.

In this manner, the present invention partitions alarms into Alarm Clusters in such a way that alarms in each cluster are probably caused by the same fault. The correlated alarm clusters can then be determined or calculated in one thread. In addition, by merging two Alarm Domains into one cluster when the common NE is not in an alarmed state, a probable faulty NE is identified even though it is not being reported in an alarmed state.

Alarm propagation characteristics dictate that faults occurring in the highest layers of the network hierarchy will cause related faults in the lower layers. For example, a fault at facility 25 of FIG. 4, will cause faults of the two contained circuits C and D. However, there are situations in which related alarms are not available at correlation time. One such situation is when, due to cost, the operator does not have fault detection devices on resources in the lowest layer. For example, a telephone network operator may not monitor all of its DS0 circuits; it may only monitor its DS1s (higher layer) for alarms. Another such situation is when a first operator leases capacity (in a higher layer) from a second operator in order to support the first operators own circuits (lower layer). The first operator may never receive alarms from the second operator concerning faults in the leased capacity. It should be noted, however, that although the alarm correlator 15 makes use of alarm propagation from higher layers to lower layers, it does not rely on all related alarms (e.g., faults of higher and lower layers) being available at correlation time.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A system for correlating alarms from a plurality of network elements (NEs) in a large communications network, said system comprising:

a plurality of alarm reporters that report alarms from the NEs when faults are detected; and an alarm correlator that partitions the alarms into correlated alarm clusters such that alarms of one cluster have a high probability that they are caused by one network fault; said alarm correlator including:

means for creating an alarm set by selecting an alarmed NE at the highest hierarchy level which is not tagged, finding all lower level NEs that are contained in the selected alarmed NE, finding all peer-related NEs for each alarmed lower level NEs and placing the highest level alarmed NE and all the found contained and peer-related NEs in the set; and means for creating additional alarm sets by repeating the steps for creating the alarm set for each alarmed NE in the network which is not tagged.

2. The system for correlating alarms of claim 1 further comprising an alarm collector that collects and stores alarms from the alarm reporters and provides uncorrelated alarms to the alarm correlator.

3. The system for correlating alarms of claim 1 wherein the alarm correlator also includes means for finding faulty NEs which are not reporting alarm states while a majority of their contained NEs are reporting alarmed states.

4. The system for correlating alarms of claim 3 wherein the alarm correlator also includes means for merging two sets into one alarm cluster if the two sets have at least one common NE, at least one common NE is not tagged, and a majority of the NEs contained by the non-tagged common NE are in an alarmed state.

5. In a large communications network having a plurality of network elements (NEs), a method of correlating alarms from the NEs comprising the steps of:

collecting a plurality of uncorrelated alarms from the NEs; and partitioning the alarms into correlated alarm clusters such that alarms of one cluster have a high probability that they are caused by one network fault, wherein the steps of partitioning the alarms include:

creating a plurality of alarm sets;

expanding the alarm sets into a plurality of alarm domains; and merging the plurality of alarm domains into alarm clusters if predefined conditions are met.

6. The method of correlating alarms of claim 5 wherein the step of creating a plurality of alarm sets includes the steps of:

creating a first alarm set, said step of creating a first alarm set comprising:

selecting an alarmed NE at the highest network hierarchy level which is not tagged;

finding all lower level NEs that are contained in the selected alarmed NE;

finding all peer-related NEs for each contained lower level NE which is in an alarmed state; and placing the highest level alarmed NE and all the found contained and peer-related NEs in the first set; and creating additional alarm sets, said step of creating additional alarm sets comprising:

selecting additional alarmed NEs in the network which are not tagged; and repeating the steps for creating the first alarm set for each selected additional alarmed NE in the network which is not tagged.

7. The method of correlating alarms of claim 6 wherein the step of expanding the alarm sets into a plurality of alarm domains includes the step of finding NEs that are not in an alarmed state which contain the highest level alarmed NE in each alarm set.

8. The method of correlating alarms of claim 7 wherein the step of finding NEs that are not in an alarmed state which contain the highest level alarmed NE in each alarm set includes the step of expanding the alarm sets to create alarm domains, the step of expanding the alarm sets including the steps of:

(a) selecting one of the alarm sets;

(b) selecting an alarmed NE which is at the highest network hierarchy level in the selected set;

(c) finding all NEs that are span-related to the selected alarmed NE;

(d) finding all NEs that are span-related to each of the found NEs that are span-related to the selected alarmed NE;

(e) adding all the found span-related NEs to the alarm set to create an alarm domain; and (f) repeating steps (b) through (e) for all of the alarm sets.

9. The method of correlating alarms of claim 8 wherein the step of merging the plurality of alarm domains into alarm clusters if predefined conditions are met includes the steps of:

determining that two alarm domains have at least one common NE;

determining that the common NE is not tagged; and determining that a majority of the NEs contained by the non-tagged common NE are in an alarmed state.

* * * * *